Sept. 28, 1971  KARL-HEINZ WIECKHORST  3,608,176
APPARATUS FOR MOUNTING COILS IN STATORS OF ELECTRIC MACHINES
Filed April 24, 1969  3 Sheets-Sheet 1
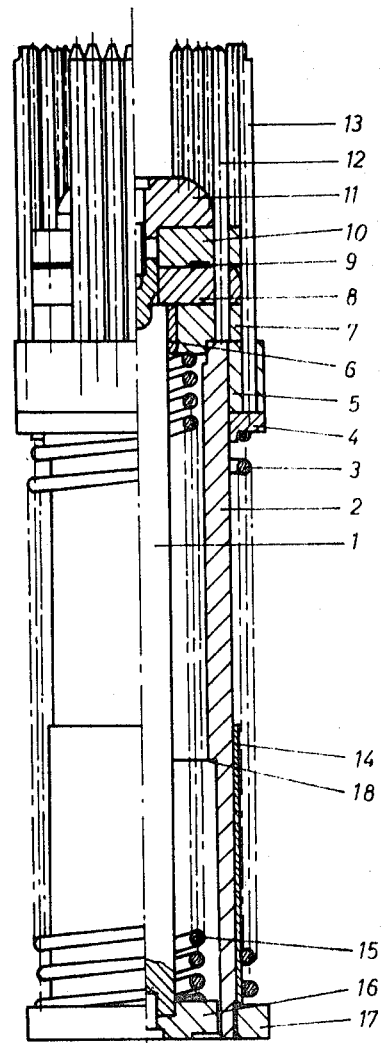
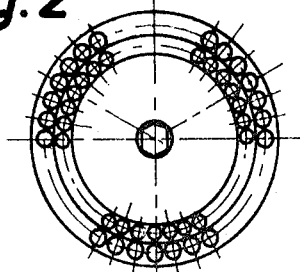
Karl-Heinz Wieckhorst
INVENTOR.
By
Polachek & Saulsbury
ATTORNEYS

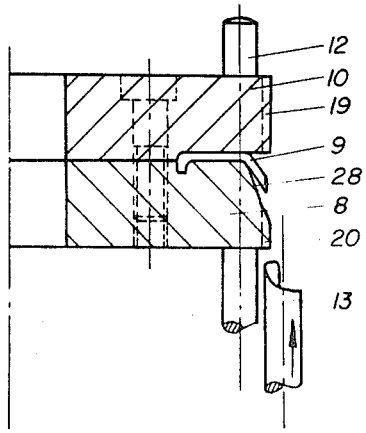
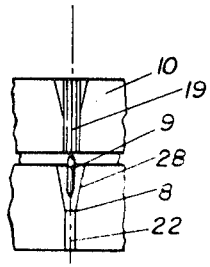
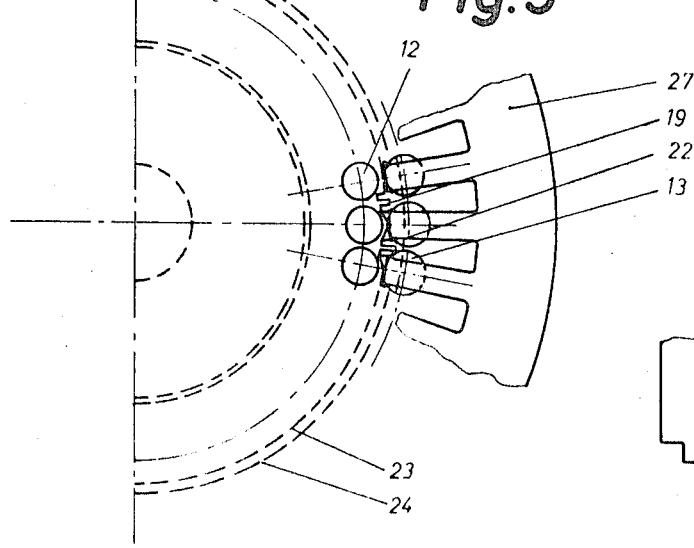
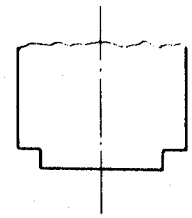
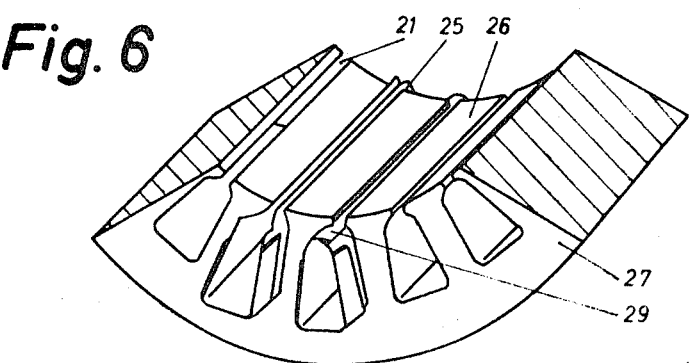

Karl-Heinz Wieckhorst
INVENTOR.

By

Polachek & Saulsbury
ATTORNEYS

United States Patent Office 3,608,176
Patented Sept. 28, 1971

3,608,176
APPARATUS FOR MOUNTING COILS IN STATORS OF ELECTRIC MACHINES
Karl-Heinz Wieckhorst, 25 Klipperstrasse, Lubeck, Germany
Filed Apr. 24, 1969, Ser. No. 818,908
Claims priority, application Germany, Apr. 25, 1968, P 17 63 258.5
Int. Cl. H02k *15/06*
U.S. Cl. 29—205         13 Claims

ABSTRACT OF THE DISCLOSURE

Prefabricated coils for a stator of an electric machine are placed on guide needles extending in parallel relation to each other and arranged in form of needle cages on two concentric pitch circles of different diameters, the pitch circle diameter of the outer needle cage which encircles the inner needle cage in the initial position is greater than the bore diameter of the stator while the diameter of the circle circumscribing the inner needle cage is smaller than the bore diameter of the stator, the needle cages being movably guided relative to each other and are shiftable by drive means coaxially to the axis of said stator in a direction towards the stator bore wherein the movement of the outer needle cage is limited by the needles of the outer cage engaging the teeth of the package of stator plates formed by the grooves when the inner needle cage is entering the stator bore and thereby drawing the coils in axial direction into the stator grooves.

BACKGROUND OF THE INVENTION

Stator windings may, for example, be inserted into the grooves of a stator in such a manner that, either the windings are successively placed longitudinally into the grooves, or by inserting a prefabricated coil, wherein winding for winding or some wire bundles are simultaneously inserted into the grooves in a substantially radial direction. On the other hand also devices are known using rollers for installing the windings, wherein the rollers are rotatably supported in an annular member which may be inserted into the stator bore. Also machines and devices are known in which the finished coil is disposed between the fingers of a draw-in ring and is drawn in axial direction from one face side of the stator into the grooves. This axially directed drawing-in of the coils is also made use of in this invention.

The hitherto known devices in which the coils are drawn into the grooves of the stator in axial direction are extremely complicated in construction if they are to be adapted for mounting various types of windings, or coils respectively. Other devices are only adapted for mounting certain types of windings, and therefore cannot be employed universally.

Two substantial points of view are of importance in the method of drawing-in. On the one hand the slot of the groove through which the coil is drawn must be covered in order to protect the wire and avoid injuries thereof during the drawing-in procedure. On the other hand the groove must be closed simultaneously while inserting the coil, because otherwise the coil might spring out of the groove again. In order to solve this latter problem thin metal sheets have been used in the known devices projecting into the groove and covering the edges of the grooves. However, these metal sheets narrow the slot of the groove and may easily be torn off or damaged if the stator plate package has not been packed and worked carefully. If covering elements are simultaneously inserted into the grooves with the coils channels must be provided each receiving one covering element. Then, during the drawing-in procedure, the covering elements are forced out of the channels and into the respective grooves by the aid of rams. Thereafter covering elements must again be placed into the channels of the device for the drawing-in procedure of the following coils. These work processes require a great expenditure of time if they are carried through manually, while a mechanically accomplished process requires complicated magazine means.

The general object of this invention is to provide an apparatus in which the aforementioned drawbacks of the known devices are avoided.

Another object of the invention is to provide an apparatus for drawing coils into the stator grooves which is of simple construction, allowing to install the coils mechanically and more rapidly in comparison with the known devices.

Still another object of the invention is to provide an apparatus of the above mentioned type which is readily adaptable for the installation of various types of coils.

SUMMARY OF THE INVENTION

For solving these problems an apparatus for mounting coils into grooves extending axially within the bore of a stator of an electric machine and opening with a slot into said bore, wherein said coils are insertable into said grooves by the aid of guide needles holding said coils is improved by the invention by the provision of:

(a) an inner needle cage comprising a plurality of parallel guide needles corresponding in number to the number of said stator grooves and being arranged in even angular spacings around a pitch circle axially aligned to the axis of said stator the diameter of the circle circumscribing said needles being less than the diameter of said stator bore, wherein the space between adjacent needles are radially aligned with said slots of the stator grooves;

(b) an outer needle cage, comprising a number of parallel guide needles equal in number to those of said inner needle cage and being arranged in even angular spacings around a pitch circle coaxially disposed to the pitch circle of said inner needle cage and having a diameter greater than that of said stator bore, wherein the spaces between adjacent needles are radially aligned with said slots of the stator grooves;

(c) coaxially arranged guide means carrying said inner and said outer needle cage allowing axial movement of said needle cages relative to each other;

(d) drive means engaging said guide means for axially shifting said needle cages in a direction towards said stator bore;

(e) stop means for limiting the axial movement of said outer needle cage towards said stator bore formed by the ends of the guide needles of the outer needle cage engaging the teeth formed between the grooves of said stator, said stop means allowing continued axial movement of said inner needle cage into the bore of said stator thereby drawing said coils arranged on said needles into said stator grooves.

The preferred embodiment of the apparatus according to the invention provides that the axis of the stator is positioned vertically and said coils are drawn into the grooves of said stator in vertical direction upwardly. By means of this arrangement it is avoided that the coils held by, or between the needle cages might become dislocated while they are being installed.

Preferably the free interspaces between the needles of each needle cage correspond to, or are less than the width of the slots of the stator grooves.

The more detailed construction of the apparatus according to the invention provides that the guide means include a collar to which the lower ends of needles of said outer cage are secured said collar being slidably guided on a sleeve and urged by a compression spring encircling said sleeve and resting on a stationary shoulder of said sleeve axially upwardly relative to said sleeve against a shoulder formed by an annular flange rigidly connected to the upper end of said sleeve and projecting radially outwardly beyond the outer diameter of said sleeve to which annular flange the lower ends of the needles of said inner needle cage are secured, said annular flange forming a seat for a compression spring arranged within said sleeve and engaging a flange-like guide member having a sliding fit within said sleeve and being secured to the end of a piston rod of said drive means preferably formed by a fluid pressure operated motor, or the like, and wherein a shaft coaxially aligned with said piston rod is secured to said guide member extending with a sliding fit through a bore of said annular flange and carrying at its upper end means for closing the grooves of said stator. Advantageously said stationary shoulder engaged by said outer compressing spring is formed by a nut threaded on the lower end of said sleeve.

In order to avoid overriding of the inner needle cage the invention provides that the drawing-in directed movement of said inner needle cage is limited by a stationary stop arranged on the outer circumference of said sleeve. Preferably this stop is formed by one end face of an abutment sleeve encircling said sleeve.

According to another feature of the invention the drawing-in directed movement of the shaft carrying said closing means is limited by a stop engaged by said flange-like guide member secured to the end of said piston rod. This stop may be formed by a shoulder provided at the inner wall of said sleeve.

In order to automatically prepare the apparatus for removing the stator with the coils installed therein, and for a new installation process the invention provides that an automatic control is provided effecting a return of the apparatus members into their initial positions by reversing said drive means when said flange-like guide members engages said stop. This automatic control may be achieved in any well known manner, for example by providing a limit switch reversing the drive means.

A preferred embodiment of the apparatus according to the invention provides that said closing means mounted on the upper end of said shaft comprise an upper and a lower closing member both closing members comprise noses projecting radially from their outer circumference corresponding in number to the number of grooves and being aligned to the slots of said grooves, said noses having an outside diameter which is greater than the stator bore, and wherein the noses of said lower closing member are inwardly and upwardly inclined and merge into wedge-shaped grooves into each of which a folding needle projects having a diameter corresponding to the width of said noses. In this said closing members are provided with bores through which the guide needles of said inner cage extend with little play.

Another feature of the invention resides in that a ram is provided at the upper extremity of said shaft above said closure means pushing said coils out of said interspaces between said guide needles.

Followingly one exemplified embodiment of the apparatus according to the invention shall be described in connection with the attached drawings.

BRIEF DESCRIPTION OF THE DRAWINGS

FIG. 1 shows a side view of the apparatus according to the invention;

FIG. 2 is a top view of the apparatus shown in FIG. 1;

FIGS. 3, 4 and 5 are partial views of the groove closing means;

FIG. 6 is a perspective partial view of the stator showing the groove insulations;

FIG. 7 shows the end of a groove insulation;

DESCRIPTION OF THE PREFERRED EMBODIMENT

Figure 8:
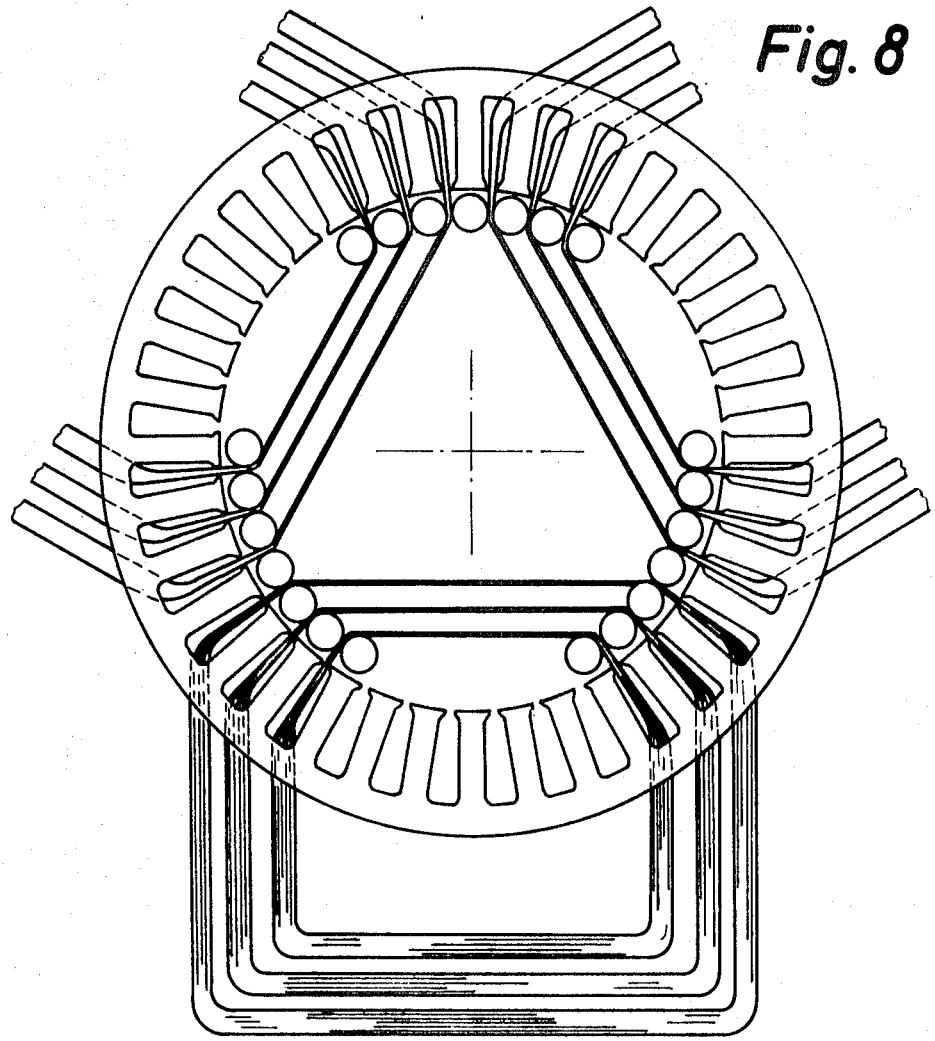
FIG. 8 shows an end view of the stator with the coils installed therein.

With reference to FIG. 1 an apparatus is shown including a shaft 1 having a flange-like guide member 16 secured to its lower end slidably arranged with a sliding fit within a sleeve 2, and carrying at its upper end groove closing means 8, 10, and 11 to be described in detail later. An annular flange 7 is threadedly secured to the upper end of the sleeve 2 and is provided with apertures to receive and secure the lower ends of guide needles 12 forming an annular inner needle cage. A bearing sleeve 6 provided in the bore of the annular flange 7 serves to slideably guide the shaft 1 extending axially therethrough. A helical compression spring 15 concentrically surrounding the shaft 1 and pretensioned between the annular flange 7 and the flange-like guide member 16 serves as a return spring for the shaft 1 and the members secured thereto. A collar 5 and a spring washer 4 secured to the lower face of the collar 5 by screws (not shown) having a sliding fit on the sleeve 2 are urged by a helical compression spring 3, surrounding the sleeve 2, and pretensioned between the spring washer 4 and a nut 17 threadedly secured to the lower end of the sleeve 2, against the annular flange 7 projecting with its outer circumference radially beyond the outer diameter of the sleeve 2. The collar 5 is secured against rotation by a key (not shown) and may be moved together with the spring washer axially downwardly against the force of the spring 3. This downwardly directed sliding movement is limited by the end face of an abutment sleeve telescopically arranged on the sleeve 2 and supported by the nut 17 threadedly secured to the lower end of the sleeve 2, when the spring washer 4 abuts thereagainst.

The collar 5 carries a plurality of guide needles 13 forming an outer needle cage. The annular flange 7 has an outside diameter which is but a few tenths of a millimeter smaller than the diameter of the stator bore.

The guide needles 12 carried by the annular flange 7 are evenly, angularly spaced around a pitch circle the diameter of which being such that the circle circumscribing the guide needles is approximately 3 mm. smaller than the bore diameter of the stator. The diameter of the guide needles 12 is such that, after the needle has been arranged on the aforementioned pitch circle, a free space remains between adjacent needles which is equal to, or a trifle smaller than the widths of the slots of the stator grooves 21.

The guide needles 13 carried by the collar 5 are secured with their lower ends on a pitch circle having a diameter corresponding to the sum of the diameter of the stator bore plus the diameter of a guide needle. In this the inscribed circle of the outer needle cage is equal to the diameter of the stator bore, wherein the diameter of the guide needles 13 is again selected so that, after arranging the needles on the last mentioned pitch circle the free space between adjacent needles is again equal to, or a trifle smaller than the widths of the groove slots, wherein the axes of the needles 12 and 13 of both cages are radially aligned to each other and the slots of the stator grooves are aligned with the corresponding spaces between the adjacent needles.

Figure 9:
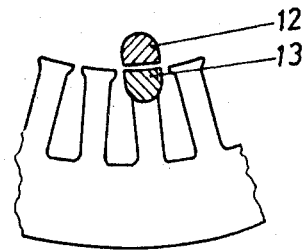
FIG. 9 is a partial end view of a package of stator plates with a cross sectional view of one guide needle each of the inner and outer needle cage.

The guide needles 13 have a profiled upper end (FIG. 3) defined by the shape of the stator teeth, or the profile of the stator teeth 26 respectively. The number of the guide needles 12 and 13 and their arrangement around the pitch circles is, of course, dependent on the number of poles and phases of the stator to be provided with coils. Normally the needles 12 and 13 will have a round cross sectional profile, however, they may also have a shape corresponding to that shown in FIG. 9. The profile of the needles according to FIG. 9 is employed if the teeth of the stator are very narrow, in which case the otherwise customary round needle would be too labile.

The closing members mounted at the upper end of the shaft 1 include an upper closing member 10 and a lower closing member 8 both provided with axial bores through which the guide needles 12 of the inner needle cage extend with a close sliding fit. The upper closing member 10 has axially extending grooves 22 provided in its outer circumference, having a depth of approximately 2 mm., and a width of approximately 0.3 to 0.4 mm. The outer circumferences of the lower closing member 8 and of the upper closing member 10 are additionally provided with radially projecting noses 19, and 20 respectively, corresponding in number to the number of stator grooves, to the slots of which they are aligned. The outside diameter of these noses, as shown at 24 in FIG. 5, is approximately 3 mm. greater than the diameter of the stator bore, while the root diameter 23 is a trifle smaller than the diameter of the stator bore.

The width of the nose 19 corresponds to the width of the slot 21 of the groove less twice the thickness of the insulating material and approximately 0.2 mm. for clearance. The nose 20 which must be narrower approximately 0.2 mm. than the slot 21 of the groove is inclined upwardly and inwardly at its upper end, as seen in FIGS. 3 and 4, and then continues as a wedge-shaped groove 28 into which a folding needle 9 projects. This needle has a diameter corresponding to the width of the nose 19 of the upper closing member 10.

The complete apparatus is secured by its flange-like guide member 16 to the end of the piston rod of a pneumatic actuating cylinder (not shown). Of course, also other types of drive means may be used instead. Vertically aligned above the apparatus the stator is arranged in a suitable device in such a manner that the coils are drawn-into the stator vertically directed from below, wherein the axis of the stator bore and the center line, or axis of symmetry respectively, of the apparatus must be aligned. In addition the slots of the stator grooves and the free spaces between the adjacent guide needles 12 and 13 must be aligned also.

The insulation in the stator grooves must be secured against shifting axially within the grooves which is suitably achieved by folding or bending the end portions of the insulation, as shown in FIG. 6. Due to the fact that the ends of the insulation are punched in the shape shown in FIG. 7 the closing with the aid of the closing means, after the coils have been installed, is facilitated substantially. Besides this, the width of the insulation must be greater than normally, since the insulation is used, on the one hand, as a cover of the groove edges and, on the other hand, as a closure of the grooves, necessitating that the longitudinal edges project into the bore of the stator approximately 2 mm.

The coils are wound in a suitable winding machine and are placed in a prefabricated state, either manually, or mechanically, between the associated interspaces of the guide needles of both needle cages, as is partly evident from FIG. 8. By actuating the pneumatic cylinder, the piston rod of which being connected to the flange-like guide member 6, the apparatus, together with the coils arranged therein, is moved upwardly. Since the diameter of the pitch circle, around which the guide needles 13 of the outer needle cage are arranged, is greater than the diameter of the stator bore the guide needles 13 will abut against the teeth 26 of the plate package of the stator thereby forming a stop for the movement of the outer needle cage. If the upwardly directed movement of the piston rod and the flange-like guide member 16 is continued the outer needle cage with the spring washer 4 and the collar 5 remain stationary, while the movement of all other members of the apparatus is continued, whereby the guide needles 12 of the inner needle cage will enter into the bore of the stator. The coils arranged in the apparatus will now, upon continued movement of the guide needles 12 of the inner needle cage, slide out of the interspaces between the guide needles 13 of the outer needle cage and into the slots of the stator grooves. The movement of the guide needles 12 of the inner needle cage is stopped when the spring washer 4 and the collar 5 abut against the upper end of the sleeve 14, in which position the plane of the upper ends of the guide needles 12 of the inner needle cage coincides with the upper face of the stator.

If the upward movement of the piston rod is continued at this stage of operation only the flange-like guide member 16 and the shaft 1 together with the closing members 8, 9, and 10 and the ram 11 mounted thereon will be moved. The ram 11 now pushes the coils out of the interspaces between the guide needles 12 of the inner needle cage upwardly while the closing members simultaneously close the grooves as will be described followingly. When the flange-like guide member 16 engages a stop 18, formed by a shoulder on the inner wall of the sleeve 2, the axially directed upward movement of the shaft 1 is stopped. By means of a well known automatic control (not shown), including for instance a limit switch, the direction of movement of the drive means is reversed at this stage, and the members of the apparatus are returned to their initial positions. During the return movement the coils are retained in the closed stator grooves. Now it is merely necessary to suitably shape the upper heads of the coils.

The closing operation of the stator grooves is achieved by the aid of the closing means shown in FIGS. 3 and 4. Since the groove insulations, as already mentioned, project about 2 mm. into the stator bore, and the closing means formed by the members 8, 9, and 10 are moved in axial direction through the stator bore when inserting the coils into the stator grooves, the coils are pressed into the grooves by the noses 19 of the upper closing member 10 while the projecting insulation slides through the grooves 22 until it enters the wedge shaped grooves 28 in the upper portion of the lower closing member 8. Due to the fact that the wedge shaped grooves change over into the noses 20 the insulation is bent at this point around the folding needles 9 and is pressed by the noses 20 through the slots 21 and into the stator grooves.

Since in case of two layer windings, or a plurality of separate windings respectively, the grooves are not to be closed immediately after a coil has been inserted, the closing members 8 and 10 of the apparatus are replaced by a distance member. Only after all of the windings have been placed into the grooves they will be closed by the aid of the closing means in a separate operation.

What is claimed:

1. An apparatus for mounting coils into grooves extending axially within the bore of a stator of an electric machine and opening with a slot into said bore, wherein said coils are insertable into said grooves by the aid of guide needles holding said coils the invention being characterized by the provision of:

(a) an inner needle cage comprising a plurality of parallel guide needles (12) corresponding in number of the number of said stator grooves and being arranged in even angular spacings around a pitch circle axially aligned to the axis of said stator the diameter of the circle circumscribing said needles being less than the diameter of said stator bore wherein the spaces between adjacent needles are radially aligned with said slots (21) of the stator grooves;

(b) an outer needle cage, comprising a number of parallel guide needles equal in number to those of said inner needle cage and being arranged in even angular spacings around a pitch circle coaxially disposed to the pitch circle of said inner needle cage and having a diameter greater than that of said stator bore, wherein the spaces between adjacent needles are radially aligned with said slots of the stator grooves;

(c) coaxially arranged guide means carrying said inner and said outer needle cage allowing axial movement of said needle cages relative to each other;

(d) drive means engaging said guide means for axially shifting said needle cages in a direction towards said stator bore;

(e) stop means for limiting the axial movement of said outer needle cage towards said stator bore formed by the ends of the guide needles (13) of the outer needle cage engaging the teeth (26) formed between the grooves of said stator, said stop means allowing continued axial movement of said inner needle cage into the bore of said stator thereby drawing said coils arranged on said needles into said stator grooves.

2. An apparatus according to claim 1, wherein the axis of the stator is positioned vertically and said coils are drawn into the grooves of said stator in vertical direction upwardly.

3. An apparatus according to claim 1, wherein the free interspaces between the needles of each needle cage correspond to, or are less than the width of the slots (21) of the stator grooves.

4. An apparatus according to claim 1, wherein said guide means include a collar (5) to which the lower ends of needles (13) of said outer cage are secured said collar being slidably guided on a sleeve (2) and urged by a compression spring (3) encircling said sleeve and resting on a stationary shoulder (17) of said sleeve axially upwardly relative to said sleeve against a shoulder formed by an annular flange (7) rigidly connected to the upper end of said sleeve and projecting radially outwardly beyond the outer diameter of said sleeve to which annular flange the lower ends of the needles (12) of said inner needle cage are secured, said annular flange forming a seat for a compression spring (15) arranged within said sleeve and engaging a flange-like guide member (16) having a sliding fit within said sleeve and being secured to the end of a piston rod of said drive means preferably formed by a fluid pressure operated motor, or the like, and wherein a shaft (1) coaxially aligned with said piston rod is secured to said guide member (16) extending with a sliding fit through a bore of said annular flange (7) and carrying at its upper end means (8 to 11) for closing the grooves of said stator.

5. An apparatus according to claim 4, wherein that said stationary shoulder engaged by said outer compressing spring (3) is formed by a nut (17) threaded on the lower end of said sleeve (2).

6. An apparatus according to claim 4, wherein the drawing-in directed movement of said inner needle cage is limited by a stationary stop (14) arranged on the outer circumference of said sleeve (2).

7. An apparatus according to claim 6, wherein said stop is formed by one end face of an abutment sleeve (14) encircling said sleeve (2).

8. An apparatus according to claim 4, wherein the drawing-in directed movement of the shaft (1) carrying said closing means (8–11) is limited by a stop (18) engaged by said flange-like guide member (16) secured to the end of said piston rod.

9. An apparatus according to claim 8, wherein said stop is formed by a shoulder (18) provided at the inner wall of said sleeve.

10. An apparatus according to claim 4, wherein an automatic control is provided effecting a return of the apparatus members into their initially positions by reversing said drive means when said flange-like guide member (16) engages said stop (18).

11. An apparatus according to claim 4, wherein said closing means mounted on the upper end of said shaft (1) comprises an upper and a lower closing member (10, and 8 respectively) both closing members comprise noses projecting radially from their outer circumference (19, 20) corresponding in number to the number of grooves and being aligned to the slots of said grooves, said noses having an outside diameter which is greater than the stator bore, and wherein the noses (20) of said lower closing member (8) are inwardly and upwardly inclined and merge into wedge-shaped grooves (28) into each of which a folding needle (19) projects having a diameter corresponding to the width of said noses.

12. An apparatus according to claim 11, wherein said closing members (9, 10) are provided with bores through which the guide needles (12) of said inner cage extend with little play.

13. An apparatus according to claim 4, wherein a ram (11) is provided at the upper extremity of said shift (1) above said closure means pushing said coils out of said interspaces between said guide needles (12, 13).

References Cited

UNITED STATES PATENTS 2,815,564  12/1957  Polard et al. _____ 29—205
2,873,515   2/1959  Winstrom _____ 29—205

THOMAS H. EAGER, Primary Examiner